US011860581B2

(12) United States Patent
Kawabe

(10) Patent No.: US 11,860,581 B2
(45) Date of Patent: Jan. 2, 2024

(54) WRISTWATCH

(71) Applicant: Seiko Epson Corporation, Toyko (JP)

(72) Inventor: Genta Kawabe, Matsumoto (JP)

(73) Assignee: SEIKO EPSON CORPORATION

( * ) Notice: Subject to any disclaimer, the term of this patent is extended or adjusted under 35 U.S.C. 154(b) by 357 days.

(21) Appl. No.: 17/231,034

(22) Filed: Apr. 15, 2021

(65) Prior Publication Data

US 2021/0325831 A1 Oct. 21, 2021

(30) Foreign Application Priority Data

Apr. 16, 2020 (JP) ................................ 2020-073351

(51) Int. Cl.

| | |
|---|---|
| ***G04B 43/00*** | (2006.01) |
| ***G04B 39/00*** | (2006.01) |
| ***G04B 19/28*** | (2006.01) |

(52) U.S. Cl.

CPC ......... *G04B 43/002* (2013.01); *G04B 19/283* (2013.01); *G04B 39/002* (2013.01)

(58) Field of Classification Search

CPC .. G04B 43/002; G04B 19/283; G04B 39/002; G04B 37/0008; G04B 37/18; G04B 43/00; G04B 37/00

See application file for complete search history.

(56) References Cited

U.S. PATENT DOCUMENTS

| | | | | |
|---|---|---|---|---|
| 4,837,756 A * | 6/1989 | Hartman | G04B 37/005 368/286 |
| D448,310 S * | 9/2001 | Streltsov | D10/30 |
| 7,815,365 B2 * | 10/2010 | Hiranuma | G04B 37/106 368/308 |
| 2018/0292789 A1 * | 10/2018 | Ichimura | G04B 37/225 |
| 2020/0292995 A1 * | 9/2020 | Garcin | G04B 19/283 |

FOREIGN PATENT DOCUMENTS

| | | | |
|---|---|---|---|
| JP | 2000206269 A * | 7/2000 | G04B 27/00 |
| JP | 2006-112832 A | 4/2006 | |
| JP | 2016-176725 A | 10/2016 | |

OTHER PUBLICATIONS

Machine translation of Hitai (JP-2000206269-A) (Year: 2023).*

* cited by examiner

*Primary Examiner* — Edwin A. Leon
*Assistant Examiner* — Sean R Brannon
(74) *Attorney, Agent, or Firm* — Harness, Dickey & Pierce, P.L.C.

(57) ABSTRACT

A wristwatch includes an outer case that comprises an opening portion, a windshield glass disposed in the opening portion, a crown arranged at a side surface of the outer case, a bezel arranged around the windshield glass, a protective member fixed to a side surface at which the crown of the outer case is disposed, wherein the protective member has a notch portion that covers at least a portion of a side surface of the outer case and at least a portion of a side surface of the bezel and exposes the crown.

5 Claims, 15 Drawing Sheets

WRISTWATCH

The present application is based on, and claims priority from JP Application Serial Number 2020-073351, filed Apr. 16, 2020, the disclosure of which is hereby incorporated by reference herein in its entirety.

BACKGROUND

1. Technical Field

The present disclosure relates to wristwatches.

2. Related Art

A wristwatch onto which a ceramic external component is mounted on a side surface of a metallic exterior case is disclosed in Japanese Unexamined Patent Application Publication No. 2016-176725. According to Japanese Unexamined Patent Application Publication No. 2016-176725, the external part is formed of ceramic, and therefore is weak against an impact. For that reason, a screw, a crown, and a bow project further outward from the external part than external parts. For example, the wristwatch was structured to inhibit damage to the external parts if it is dropped.

However, the external part described in Japanese Unexamined Patent Application Publication No. 2016-176725 is a member that enhances decorative properties, and does not protect the watch body. For example, if a ceramic bezel is used, the bezel may fail if the wristwatch is dropped. Particularly, in a case of a wristwatch for divers equipped with a rotating bezel that displays a diving time or the like, there is also a risk that the rotary bezel could become damaged and becomes unmovable, which may result in its not functioning. In addition, generally, there are many users who wear a wristwatch on their left arm, and the outer case around the crown is often exposed to the outside of the clothing, so it is easy to get scratched during daily use. Therefore, a constitution was required in which the outer case and bezel around the crown are not easily scratched, without compromising operability.

SUMMARY

A wristwatch includes: an outer case having an opening portion, a windshield glass disposed in the opening portion, a crown disposed on a side surface of the outer case, a bezel disposed around the windshield glass, a protective member fixed to a side surface of the outer case at which the crown is disposed, wherein the protective member includes a notch portion that covers at least a portion of a side surface of the outer case and at least a portion of a side surface of the bezel, and exposes the crown.

DESCRIPTION OF EXEMPLARY EMBODIMENTS

First Embodiment

Figure 1:
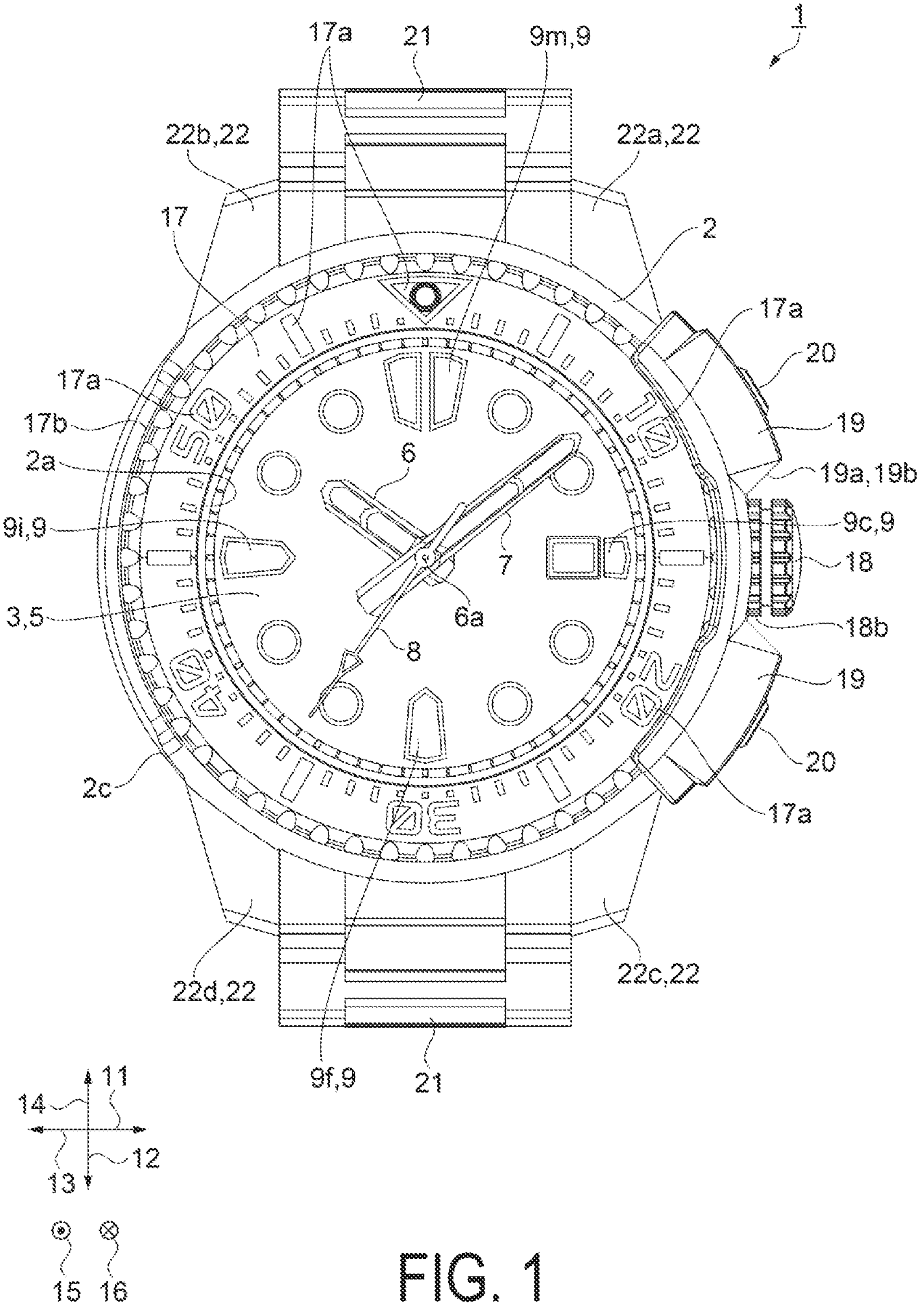
FIG. 1 is a front view illustrating a wristwatch according to a first embodiment.

As shown in FIGS. 1-7, wristwatch 1 is a diver's watch worn on a user's wrist. A diver's watch is a type of diving watch. The watch 1 includes an outer case 2, a windshield glass 3, and a case back 4. A dial 5, a watch movement, an hour hand 6, a minute hand 7, and a seconds hand 8 are disposed in the outer case 2. The hour hand 6, the minute hand 7 and the seconds hand 8 are driven by the watch movement.

The outer case 2 includes an opening portion 2*a*. The windshield glass 3 is disposed in the opening portion 2*a*. The hour hand 6, minute hand 7 and seconds hand 8 indicate time of day. The dial 5 includes an indicator 9. The indicator 9 is the graduation of the hour hand 6, the minute hand 7, and the seconds hand 8.

The direction in which the indicator 9*c* for 3 o'clock is relative to the axis 6*a* for the hour hand 6 is the 3 o'clock direction 11. The direction in which the indicator 9*f* for 6 o'clock is relative to the axis 6*a* for the hour hand 6 is the 6 o'clock direction 12. The direction in which the indicator 9*i* for 9 o'clock is relative to the axis 6*a* for the hour hand 6, in other words, the opposite direction of the 3 o'clock direction 11 is the 9 o'clock direction 13. The direction in which the indicator 9*m* for 12 o'clock is relative to the axis 6*a* for the hour hand 6 is the 12 o'clock direction 14. The direction from the case back 4 toward the windshield glass 3 is the top direction 15. The opposite direction of the top direction 15 is a back direction 16.

A bezel 17 that rotates around the axis 6*a* of the hour hand 6 is disposed at the outer case 2. The bezel 17 is disposed around the windshield glass 3. The bezel 17 includes a mark 17*a* on a surface facing the top direction 15. The mark 17*a* is disposed on the windshield glass 3 side of the bezel 17. The shape of the mark 17*a* is not particularly limited. With the present embodiment, for example, the mark 17*a* includes numbers for every 10, from 10 to 50. In addition, the mark 17*a* includes a rectangle at positions dividing the numbers into 10 equal parts. The bezel 17 includes a triangular mark 17*a* at the 12 o'clock direction 14 of the axis 6*a*. The mark 17*a* functions as a scale indicating the amount of movement of the hour hand 6, the minute hand 7, and the seconds hand 8.

The crown 18 is disposed at a side surface 2*c* of the outer case 2 in the 3 o'clock direction 11. The crown 18 is rotatable and can be pushed and pulled. When the user of wristwatch 1 rotates crown 18, the crown 18 can be pulled out. When the crown 18 is pulled out, the seconds hand 8 stops. When the crown 18 is pulled out and rotated, the hour hand 6 and the minute hand 7 rotate about axis 6*a*. The user of wristwatch 1 operates the crown 18 to correct the time indicated by the hour hand 6 and the minute hand 7. After correcting the time, the user of the wristwatch 1 actuates the seconds hand 8 by pushing the crown 18 inward. After pushing the crown 18 inward, the crown 18 is no longer pulled out, by rotating the crown 18. Therefore, the operation of the crown 18 is locked.

A protective member 19 is fastened to the side surface 2*c* of the outer case 2 to which the crown 18 is disposed at the 3 o'clock direction 11 of the outer case 2. The protective member 19 is fastened to the outer case 2 by two bolts 20. The protective member 19 covers a portion of the side surface 2*c* of the outer case 2 and a portion of the side surface 17*b* of the bezel 17. According to this configuration, the wristwatch 1 is equipped with the protective member 19 that covers a portion of the side surface 2*c* of the outer case 2 and a portion of the side surface 17*b* of the bezel 17. Therefore, even when impacted, the protective member 19 protects the outer case 2 and the bezel 17.

The protective member 19 has a notch portion 19*a* that exposes the crown 18. Furthermore, because the protective member 19 includes a notch portion 19*a* that exposes the crown 18, the crown 18 can be operated. Therefore, according to this wristwatch 1, the outer case 2 and the bezel 17 around the crown 18 can be protected by the protective member 19 without impairing operability.

By loosening the bolt 20, the protective member 19 can be separated from the outer case 2. Accordingly, a plurality of protective members 19 having different shapes can be prepared, and the protective member 19 can be replaced with the outer case 2. By changing the appearance of the protective member 19 without changing the appearance of the outer case 2, the appearance of the wristwatch 1 on which the protective member 19 is mounted can be changed. At this time, by designing only the protective member 19 without redesigning the outer case 2, it is possible to reduce the time required to design the shape change. Even in molds for manufacturing the wristwatch 1, the molds of the outer case 2 can be used without changing, and for that reason a new model can be offered with high productivity.

When the wristwatch 1 is attached to an arm, the wristwatch 1 on the 3 o'clock direction 11 side is exposed from a wet suit. Because the bezel 17 is protected by the protective member 19, it is possible to prevent the bezel 17 from rotating by inadvertently hitting the bezel 17 against an object such as a tank.

A user of wristwatch 1 can loosen bolt 20 to separate the protective member 19 from outer case 2. The user of the wristwatch 1 can implement maintenance by removing dirt, sand, and the like from between the protective member 19 and the outer case 2.

The 6 o'clock direction 12 side and the 12 o'clock direction 14 side of the crown 18 are coupled, making the protective member 19 one body. Therefore, the crown 18 can easily be fastened to the outer case 2 compared to when the 6 o'clock direction 12 side and the 12 o'clock direction 14 side of the crown 18 are separate bodies.

As illustrated in FIG. 1, a portion of the bezel 17 overlaps with the protective member 19 in a plan view of the windshield glass 3. The protective member 19 does not overlap with the mark 17*a*. According to this constitution, the bezel 17 and the protective member 19 overlap in a plan view of the windshield glass 3. The protective member 19 covers a portion of the outer peripheral side of the bezel 17. Therefore, contamination caused by foreign matter between the bezel 17 and the sheath case 2 can be suppressed. The protective member 19 does not overlap the mark 17*a*, so the mark 17*a* is exposed. For that reason, the user of wristwatch 1 can interpret the mark 17*a*.

A band 21 is disposed from the 12 o'clock direction 14 side to the 6 o'clock 12 side of the outer case 2. The outer case 2 is equipped with a plurality of bows 22 coupled to the band 21. At the 12 o'clock direction 14 side of the outer case 2, the first bow 22*a* is disposed at the 3 o'clock direction 11 side of the band 21, and the second bow 22*b* is disposed at the 9 o'clock direction 13 side of the band 21. The end of the band 21 at the 12 o'clock direction 14 side of the first and second bows 22*a* and 22*b* is coupled to the outer case 2.

A third bow 22*c* is disposed on the 3 o'clock direction 11 side of the band 210 at the 6 o'clock direction 12 side of the outer case 2, and a fourth bow 22*d* is disposed at the 9 o'clock direction 13 side of the band 21. The end of the band 21 at the 6 o'clock direction 12 side in the third and fourth bows 22*c* and 22*d* is coupled to the outer case 2.

In this way, a plurality of bows 22 is equipped with a first bow 22*a* and a second bow 22*b* for coupling of the band 21 that are disposed at one side of the outer case 2, and a third bow 22*c* and a fourth bow 22*d* for coupling of the band 21 that are disposed at another side of the outer case 2. The first and third bows 22*a* and 22*c* are arranged at the crown 18 side.

The protective member 19 is arranged between the two bows 22 of the first and third bows 22*a* and 22*c* arranged at the crown 18 side. Specifically, the protective member 19 covers the side surface 2*c* of the outer case 2 and the side surface 17*b* of the bezel 17 between the first and third bows 22*a* and 22*c*. According to this constitution, damage to the side surface 2*c* of the outer case 2 and the side surface 17*b* of the bezel 17 between the two bows 22 arranged on the crown 18 side can be inhibited.

Figure 2:
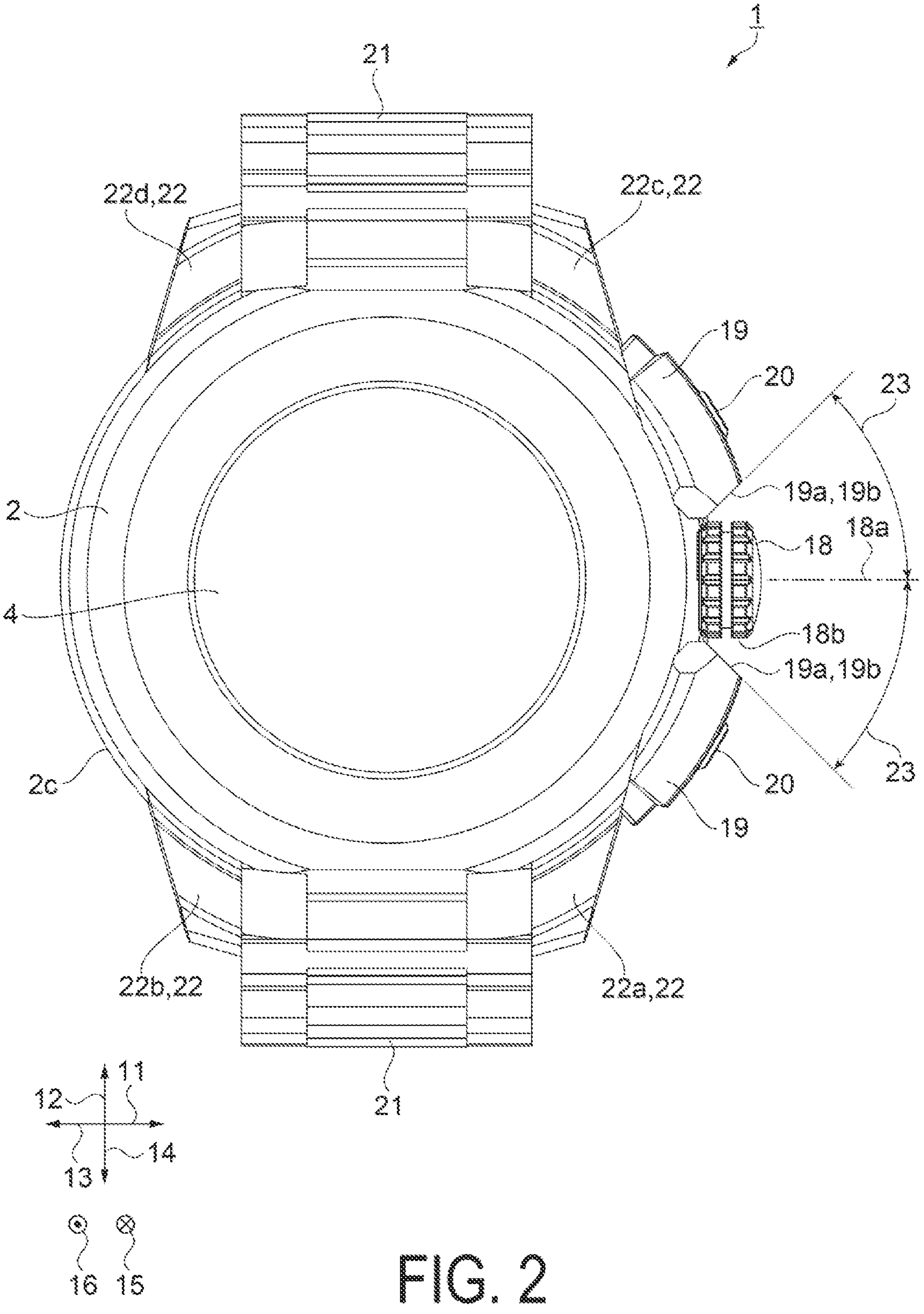
FIG. 2 is a rear view showing a wristwatch.

As illustrated in FIGS. 1 and 2, the shape of the notch portion 19*a* looking from the top direction 15 and the back direction 16 is trapezoidal. The notch portion 19*a* is equipped with an oblique face 19*b* that faces the side surface 18*b* of the crown 18. The oblique angles 23, which are the angles formed by the rotating shaft 18*a* and the oblique face 19*b* of the crown 18 are from 45 degrees to 55 degrees. When the angle formed by the rotating shaft 18*a* and the oblique face 19*b* of the crown 18 is 45 degrees or higher, there is a space between the crown 18 and the oblique face 19*b*, so the user of the wristwatch 1 can easily grip and rotate the crown 18. When the angle formed by the rotating shaft 18 a and the oblique face 19*b* of the crown 18 is 55 degrees or less, the crown 18 and the oblique face 19*b* are close, so the protective member 19 inhibits an object near the crown 18 from colliding with the crown 18. Therefore, it is preferably from 45 degrees to 55 degrees.

Figure 3:
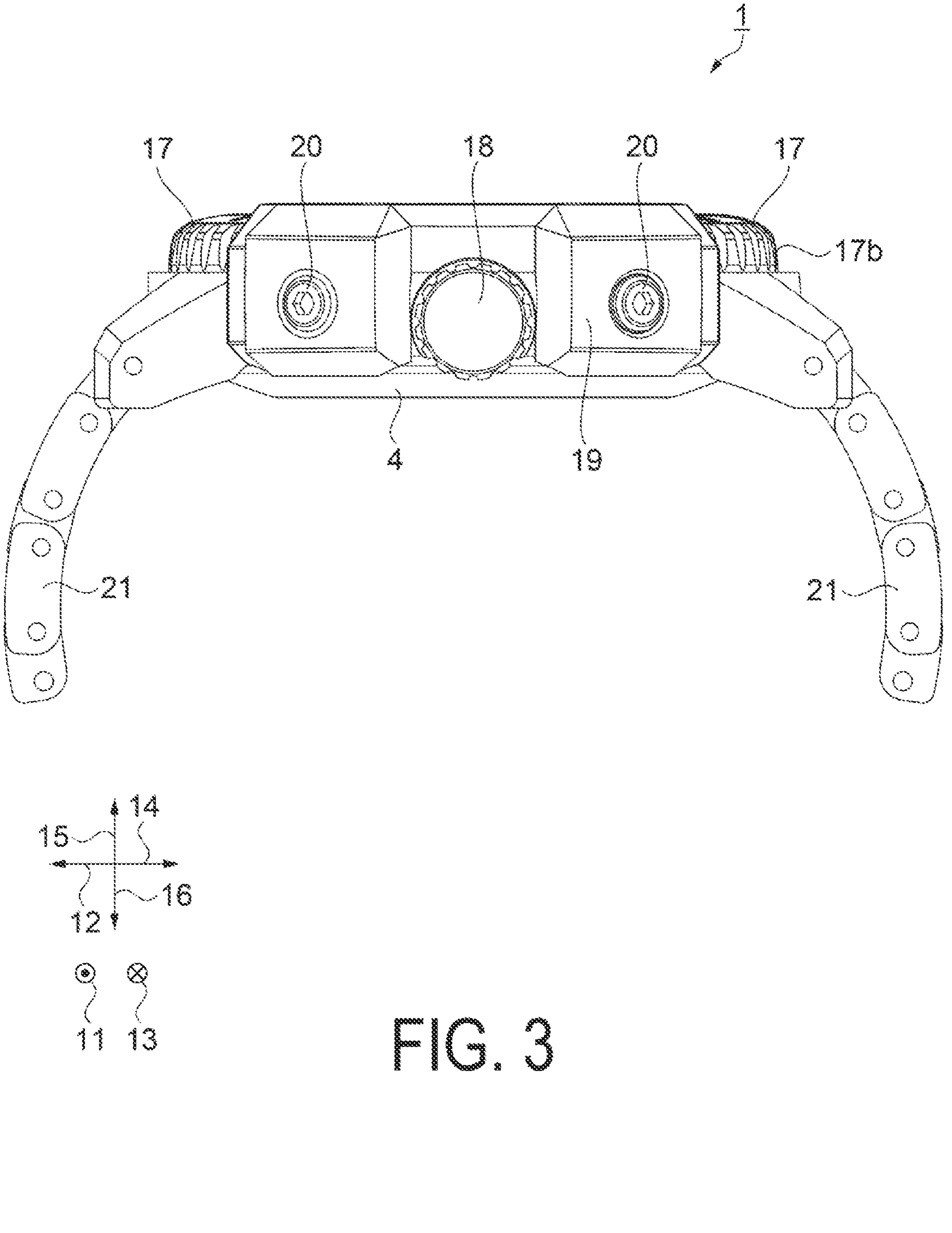
FIG. 3 is a side view looking from a 3 o'clock direction showing the wristwatch.
Figure 4:
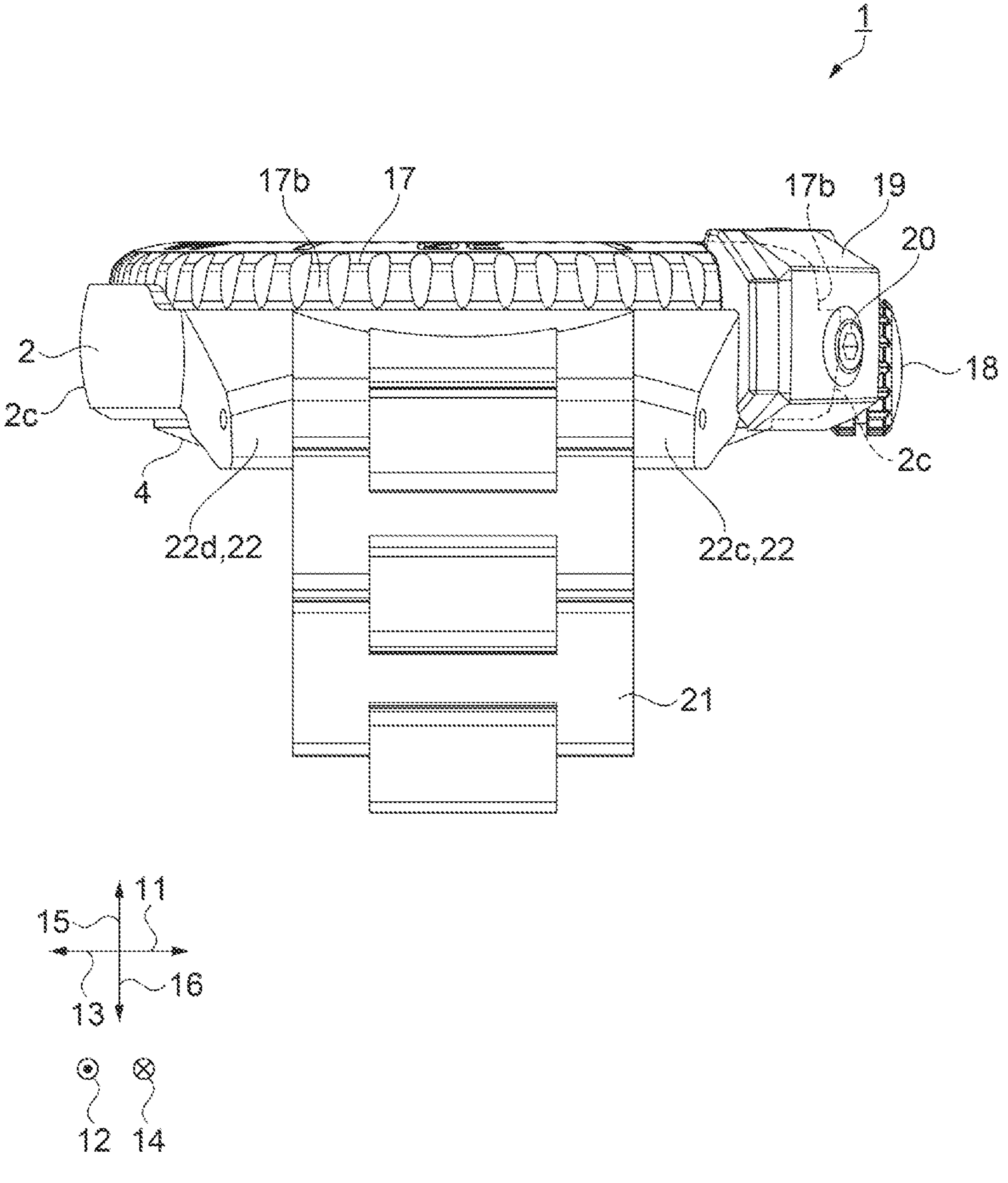
FIG. 4 is a side view looking from a 6 o'clock direction showing the wristwatch.
Figure 5:
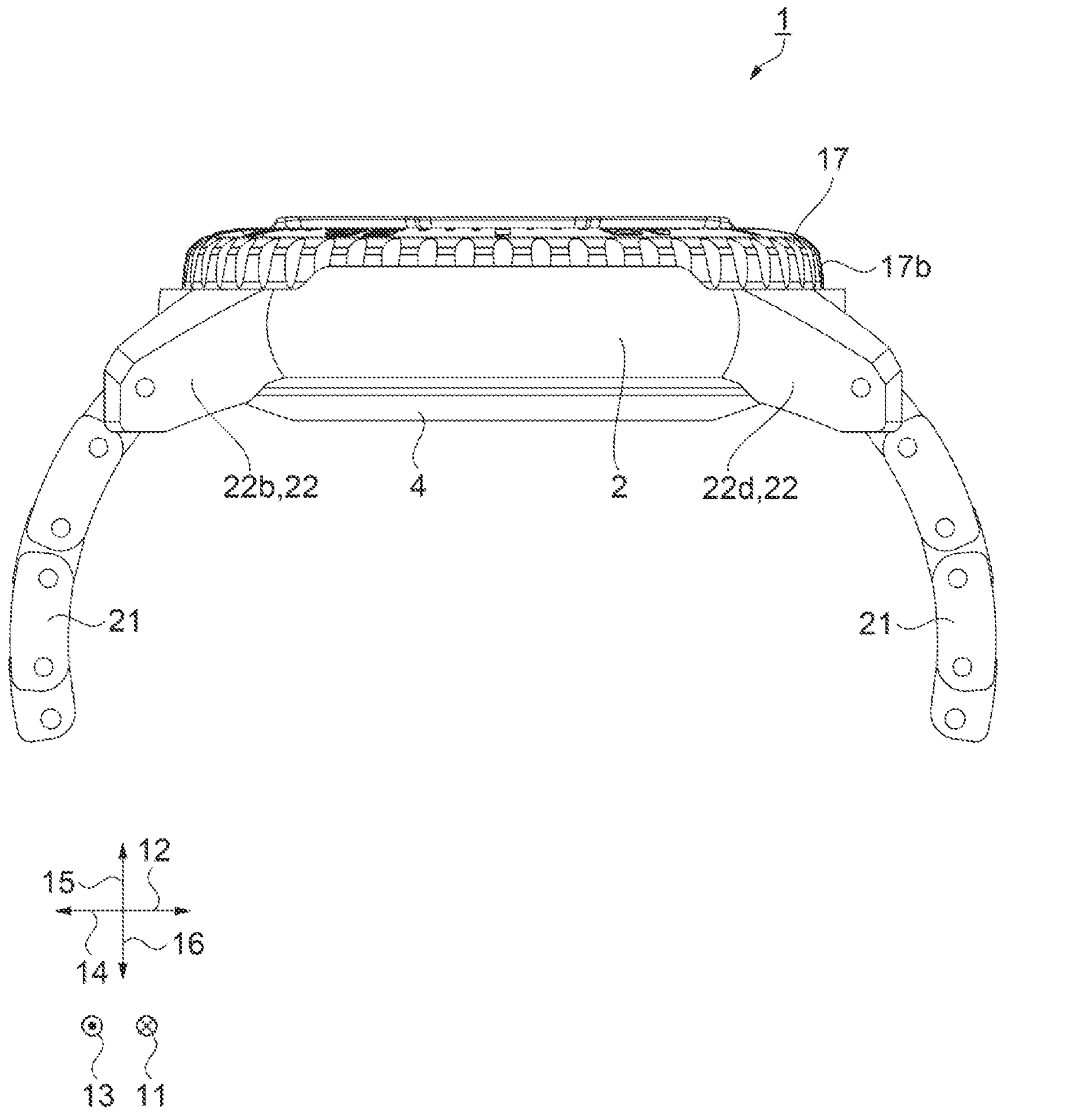
FIG. 5 is a side view looking from a 9 o'clock direction showing the wristwatch.
Figure 6:
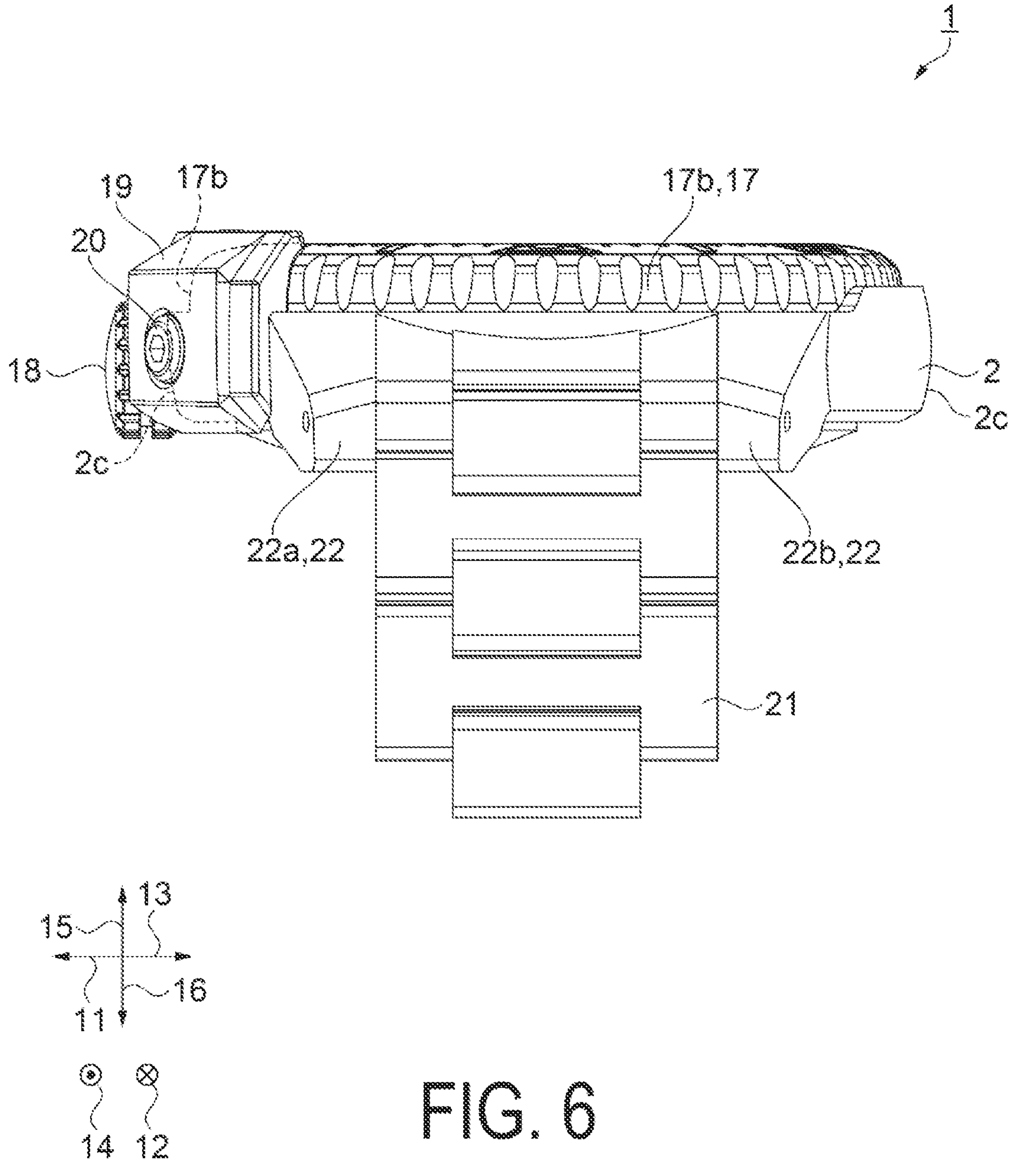
FIG. 6 is a side view looking from a 12 o'clock direction showing the wristwatch.

As shown in FIGS. 3 and 4, the protective member 19 extends at the top direction 15 side of the bezel 17 and the back direction 16 side of the case back 4. Specifically, the protective member 19 has a shape that overlaps a portion of the bezel 17 in a plan view, and overlaps a portion of the case back 4. Said another way, the cross-sectional shape of the protective member 19 is U-shaped and covers a portion of the bezel 17 and a portion of the case back 4. Therefore, it is difficult for foreign matter such as sand or the like to get between the protective member 19 and the outer case 2. Furthermore, when the protective member 19 is screwed and fastened to the outer case 2, positioning of the top direction 15 and the back direction 16 with respect to the outer case 2 can be easily implemented. Therefore, the user of the wristwatch 1 can easily position the protective member 19 relative to the outer case 2.

Figure 7:
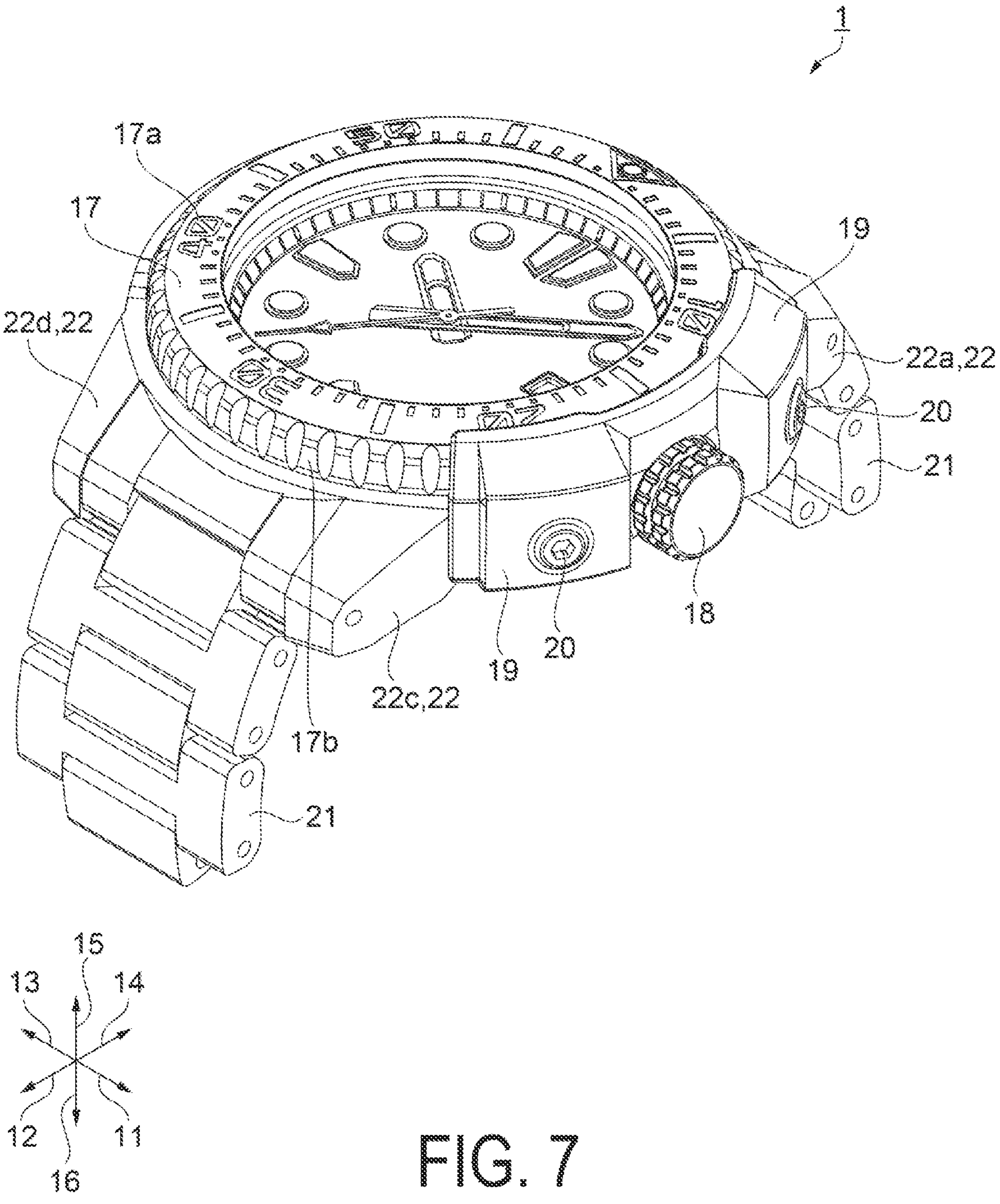
FIG. 7 is a perspective view of the wristwatch.
Figure 8:
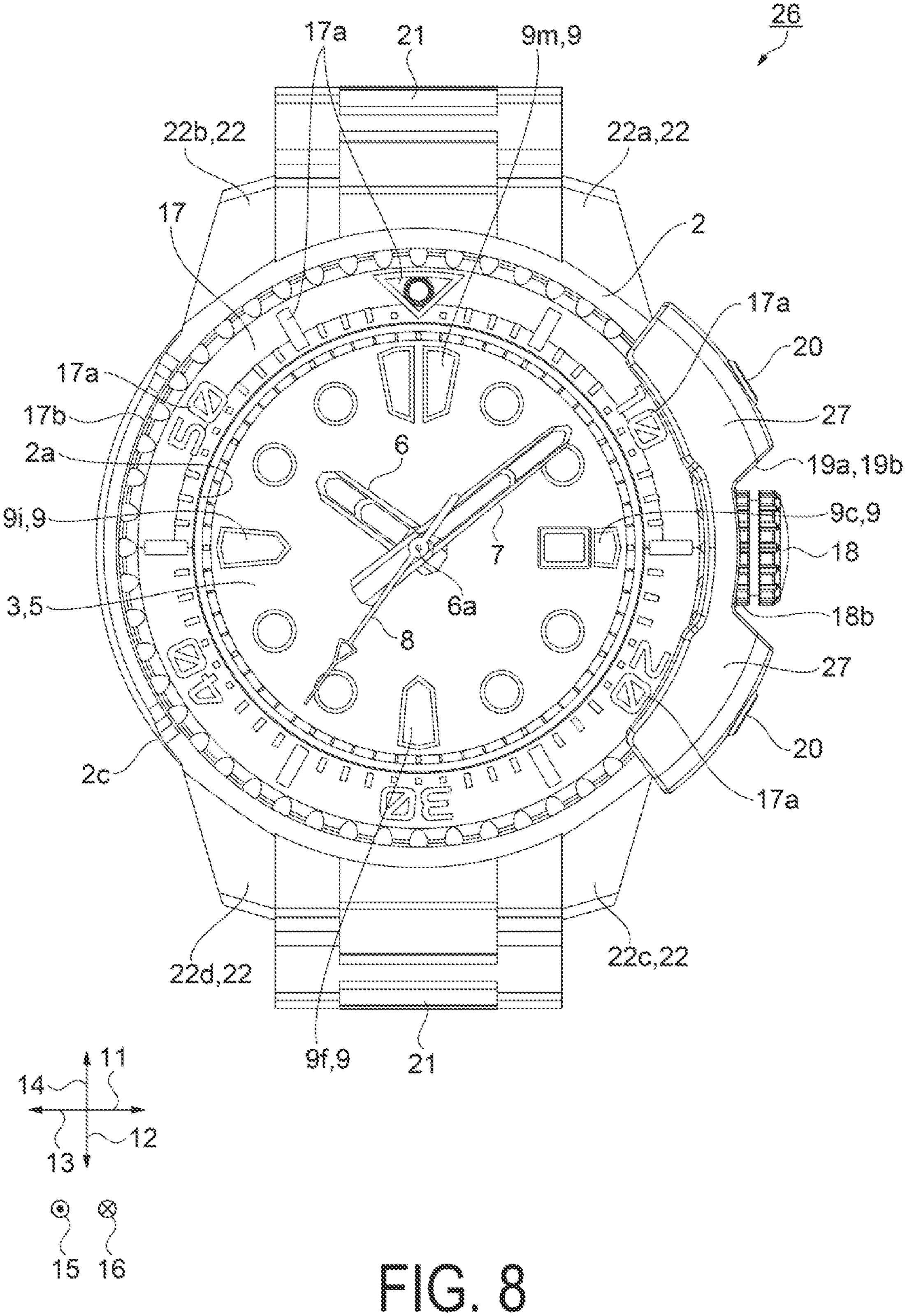
FIG. 8 is a front view illustrating a wristwatch according to a second embodiment.
Figure 9:
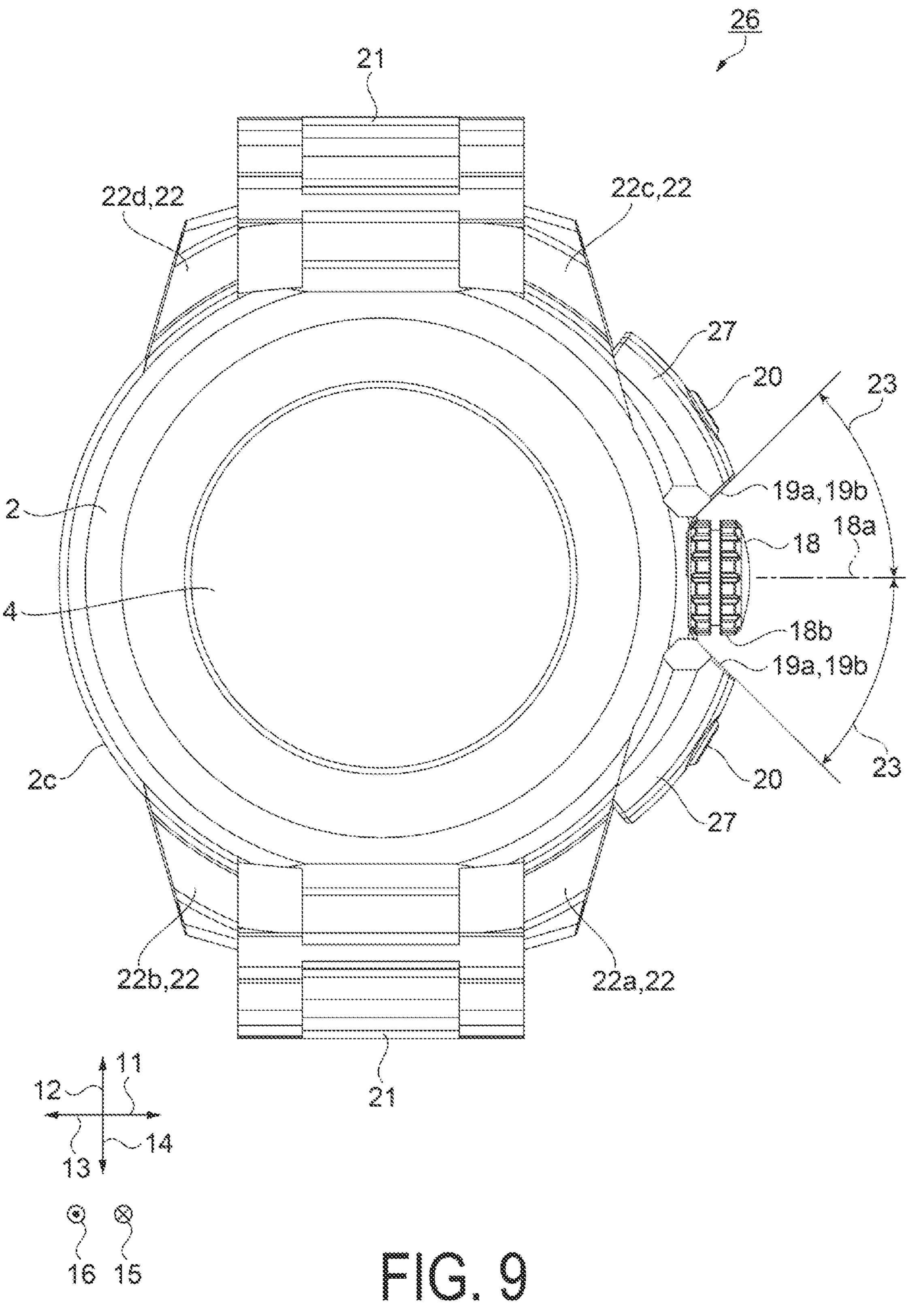
FIG. 9 is a rear view showing the wristwatch.
Figure 10:
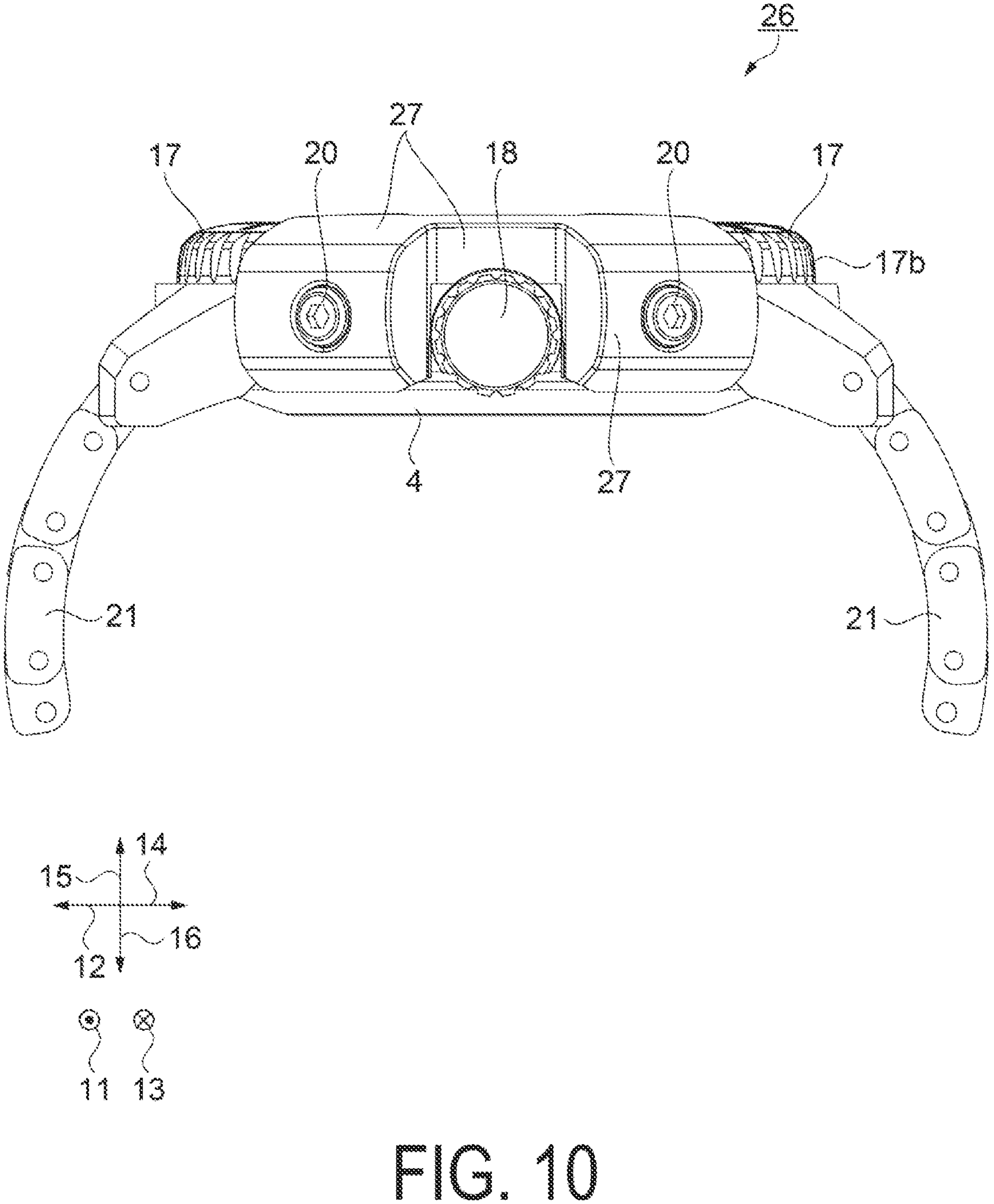
FIG. 10 is a side view looking from a 3 o'clock direction showing the wristwatch.
Figure 11:
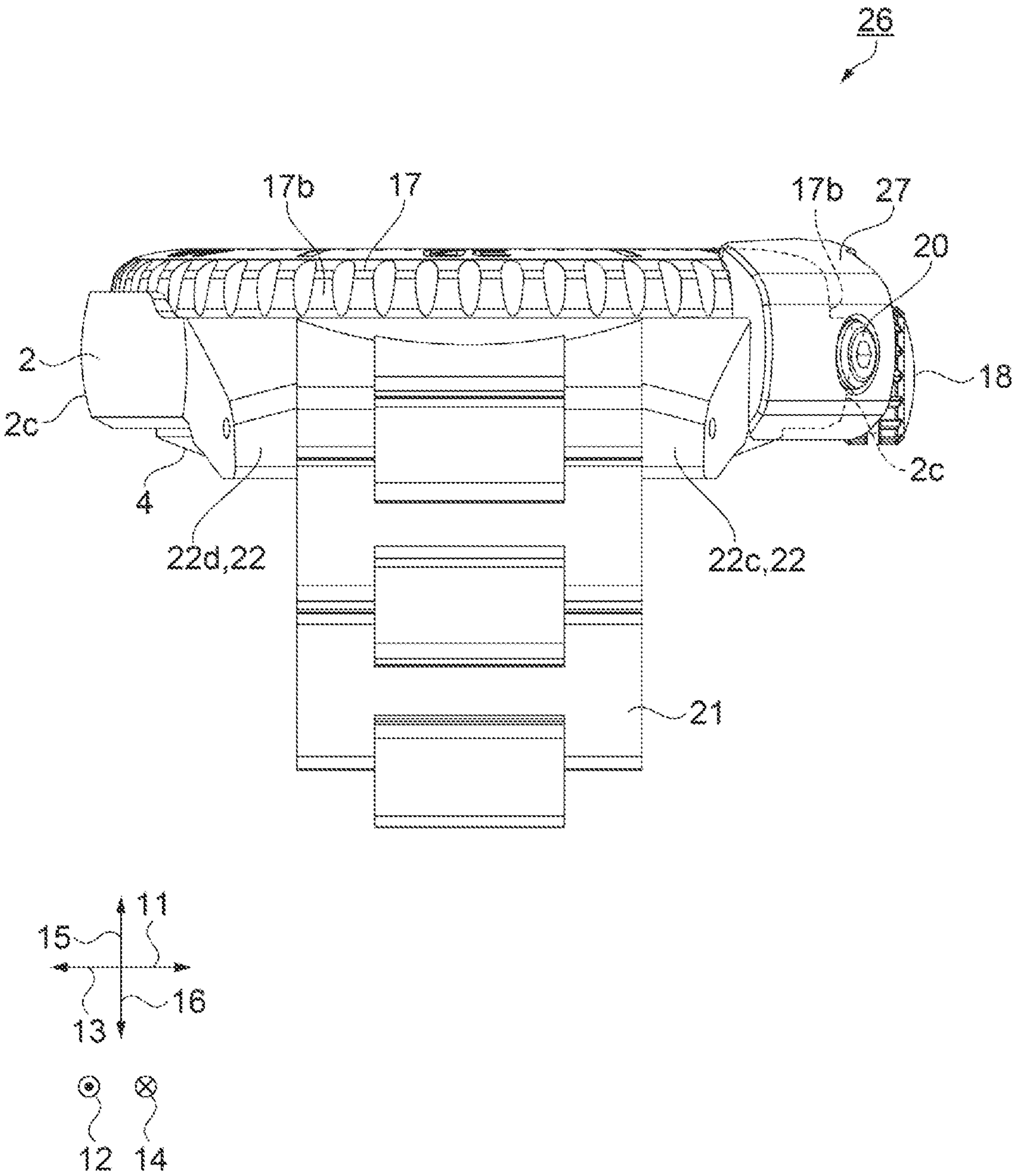
FIG. 11 is a side view looking from a 6 o'clock direction showing the wristwatch.
Figure 12:
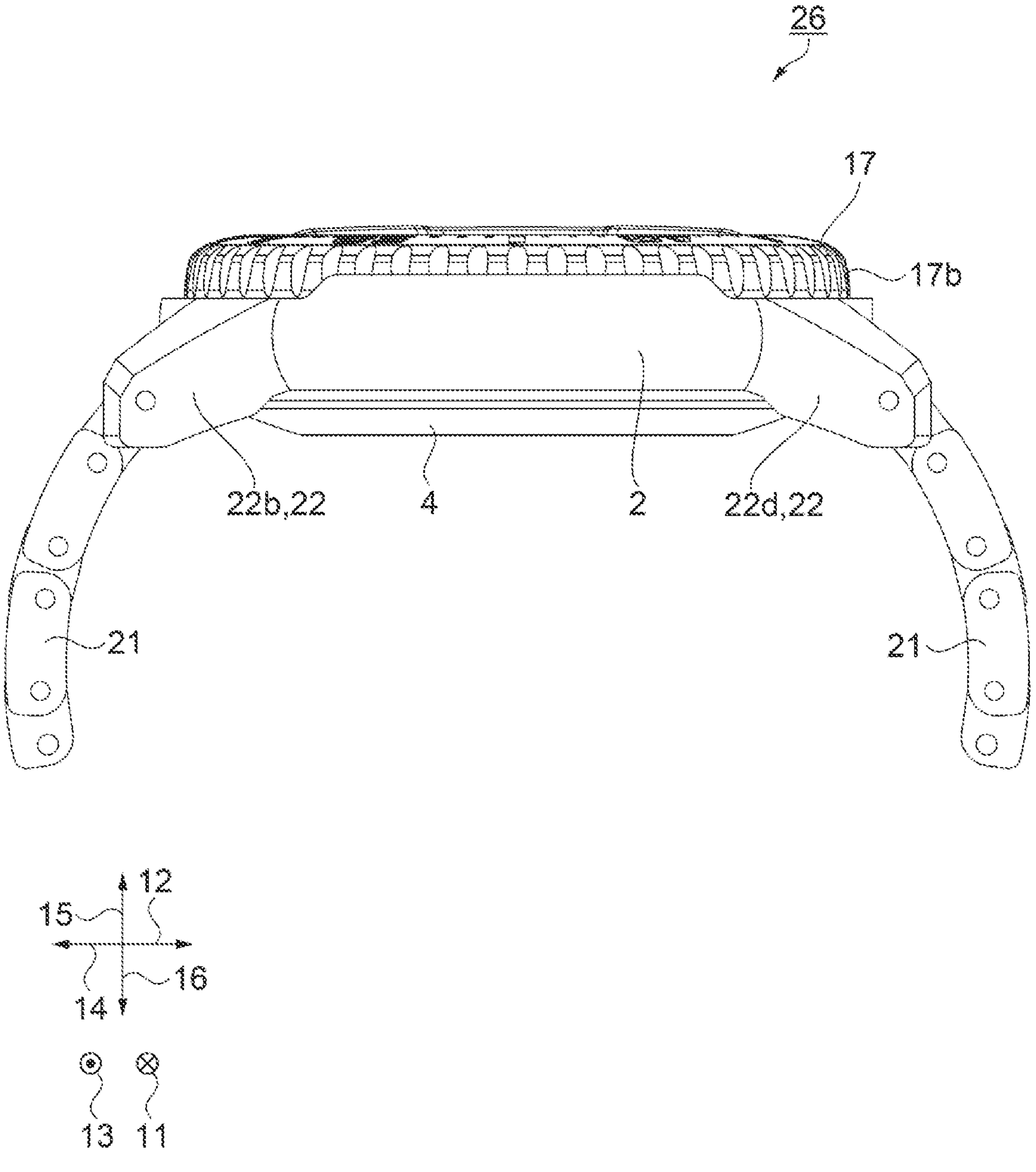
FIG. 12 is a side view looking from a 9 o'clock direction showing the wristwatch.
Figure 13:
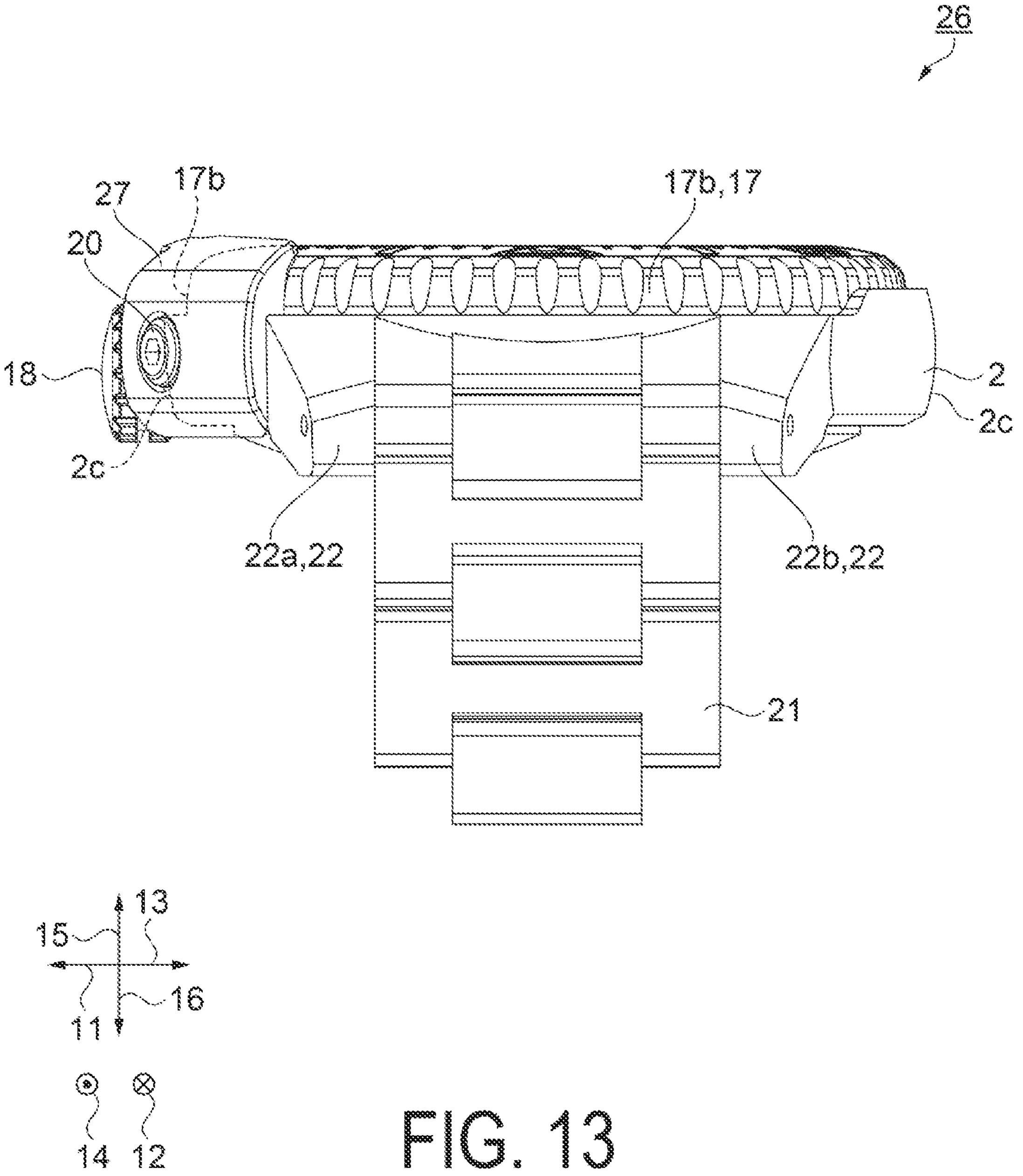
FIG. 13 is a side view looking from a 12 o'clock direction showing the wristwatch.
Figure 14:
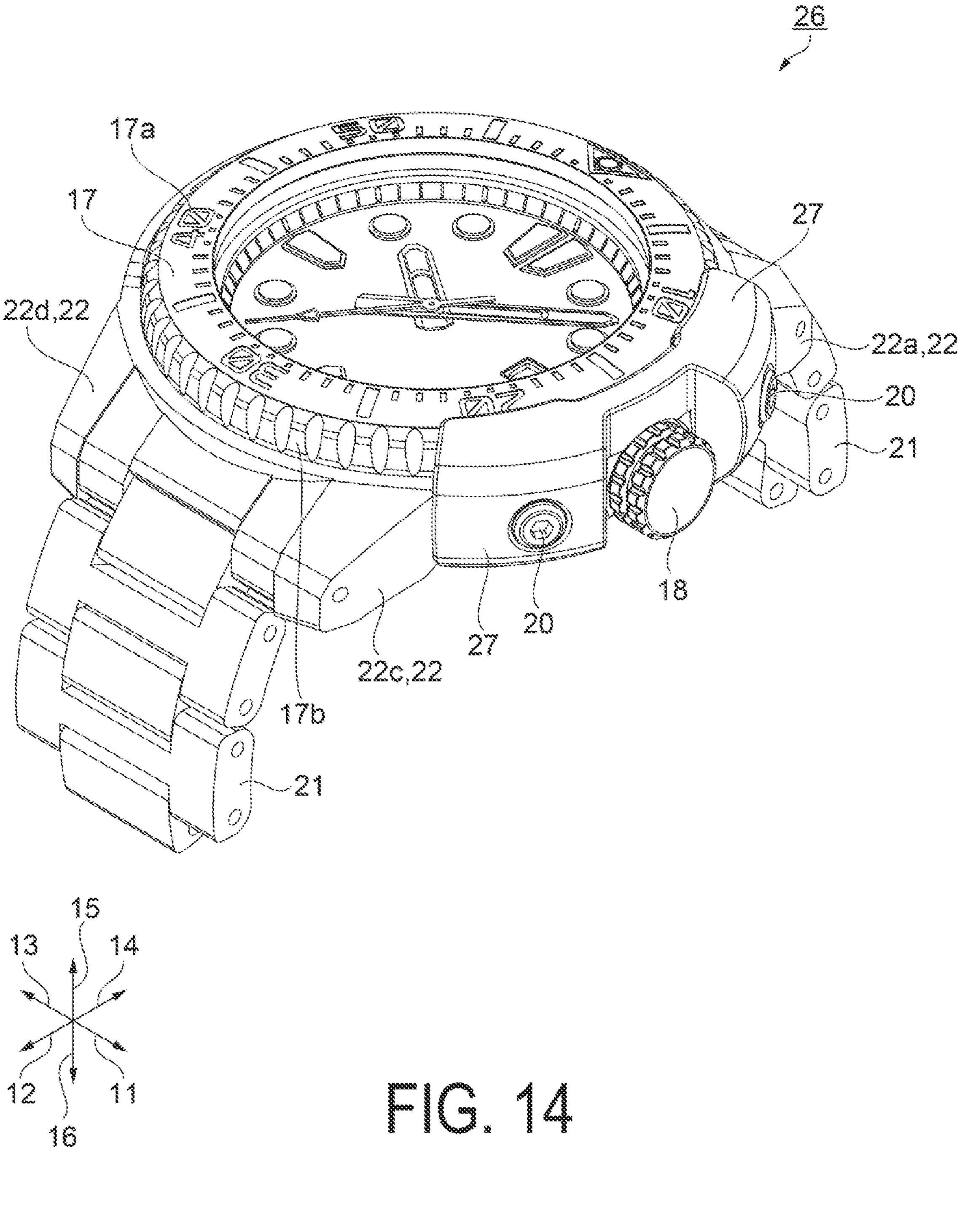
FIG. 14 is a perspective view of the wristwatch.

As shown in FIG. 7, by featuring an external appearance of the protective member 19, the design of the wristwatch 1 can be improved. Also, when the user of wristwatch 1 rotates bezel 17, the user operates by sandwiching the bezel 17 at 6 o'clock 12 and 12 o'clock 14. Therefore, the protective member 19 protects the outer case 2 and the bezel 17 without interfering with the rotation of the bezel 17.

Second Embodiment

The present embodiment differs from the first embodiment in that the shape of the protective member 19 is different.

Moreover, the same constituent elements as those in the first embodiment 1 are denoted using the same reference symbols, descriptions thereof will be omitted.

As shown in FIGS. 8 through 14, a wristwatch 26 is equipped with an outer case 2. A protective member 27 is fastened to a side surface 2*c* of a 3 o'clock direction 11 of the outer case 2. The protective member 27 is fastened to the outer case 2 by two bolts 20. The protective member 27 covers a portion of the side surface 2*c* of the outer case 2 and a portion of the side surface 17*b* of the bezel 17. According to this constitution, the wristwatch 26 is equipped with the protective member 27 that covers a portion of the side surface 2*c* of the outer case 2 and a portion of the side surface 17*b* of the bezel 17, the protective member 27 protects the outer case 2 and the bezel 17.

Third Embodiment

The present embodiment differs from the first embodiment in that the shape of the protective member 19 is different.

Moreover, the same constituent elements as those in the first embodiment 1 are denoted using the same reference symbols, descriptions thereof will be omitted.

Figure 15:
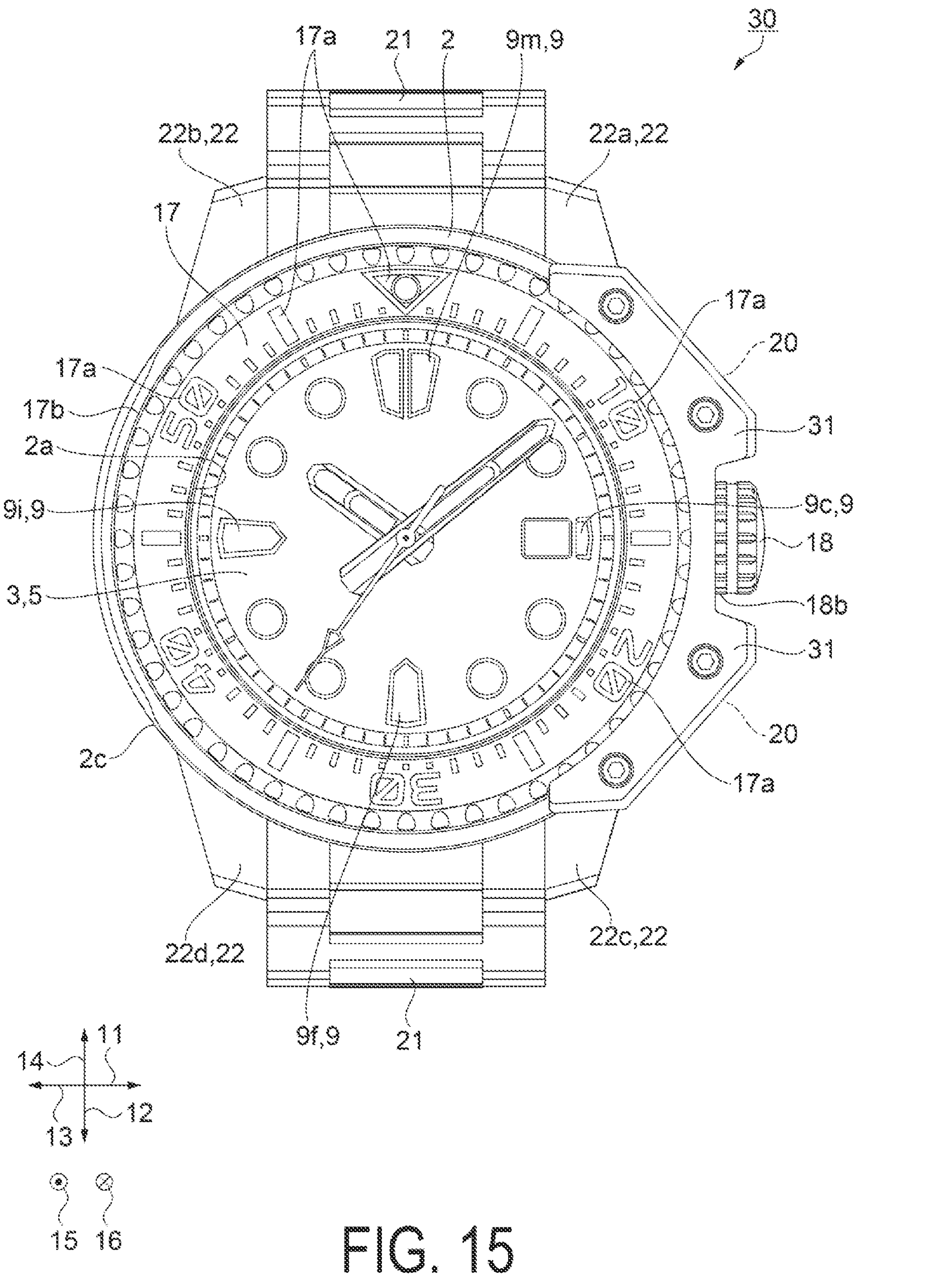
FIG. 15 is a front view illustrating a wristwatch according to a third embodiment.

As shown in FIG. 15, a wristwatch 30 is equipped with an outer case 2. The protective member 31 is fastened to a side surface 2*c* of the outer case 2 at the 3 o'clock direction 11 side surface. The protective member 31 is fastened to the outer case 2 by a bolt 20 or the like. The protective member 31 covers a portion of the side surface 2*c* of the outer case 2 and a portion of the side surface 17*b* of the bezel 17. According to this constitution, the wristwatch 30 is equipped with the protective member 31 that covers a portion of the side surface 2*c* of the outer case 2 and a portion of the side surface 17*b* of the bezel 17, the protective member 31 protects the outer case 2 and the bezel 17.

Fourth Embodiment

In the first embodiment, the protective member 19 covers a portion of the side surface 2*c* of the outer case 2. The protective member 19 may also cover all sides of the outer case 2. The protective member 19 can protect all sides of the outer case 2.

In the first embodiment, the protective member 19 covers a portion of the side surface 17*b* of the bezel 17. The protective member 19 may also cover all sides 17*b* of the bezel 17. The protective member 19 protects all sides of the bezel 17.

In the first embodiment, an example of a diver's watch is depicted for the wristwatch 1. Furthermore, the present disclosure can also be applied to quartz type or mechanical wristwatches, or wristwatches equipped with a solar battery. In addition, it can also be applied to wristwatches equipped with a pressure gauge or inertia sensor. In addition, although the first embodiment describes a bezel that is rotatable, a fastened bezel that does not rotate can also be applied with the present disclosure.

What is claimed is:

1. A wristwatch comprising:
an outer case having an opening;
a windshield glass arranged at the opening;
a crown arranged at a side surface of the outer case;
a bezel arranged around the windshield glass; and
a protective member fixed to a side surface at which the crown of the outer case is arranged,
wherein the protective member covers at least a portion of a side surface of the outer case and at least a portion of a side surface of the bezel, and covers a portion of the bezel when seen in a plan view of the windshield glass, and includes a first notch portion that exposes the crown and a second notch portion that is opposite to the first notch, and
wherein the bezel comprises a mark on the windshield glass side located directly adjacent to the second notch portion of the protective member and radially inward from the crown, and the protective member does not overlap the mark.

2. The wristwatch according to claim 1, wherein the first notch portion comprises an oblique face that opposes a side surface of the crown, and an angle formed by the rotating shaft of the crown and the oblique face is from 45 degrees to 55 degrees.

3. The wristwatch according to claim 1, wherein the outer case comprises a plurality of bows coupled to a band, the plurality of bows includes a first bow and a second bow disposed at one side of the outer case for coupling of the band, and a third bow and a fourth bow disposed at another side of the outer case for coupling of the band, and the first and the third bows are disposed on the crown side, and the protective member is arranged between the first bow and the third bow.

4. The wristwatch according to claim 1, comprising: a case back, wherein the outer case includes a second opening portion that is different from the opening portion, and the case back is arranged at the second opening portion, and a portion of the case back and the protective member overlap in plan view of the windshield glass.

5. The wristwatch according to claim 1, wherein the bezel is configured to rotate.

* * * * *